United States Patent Office 3,190,630
Patented June 22, 1965

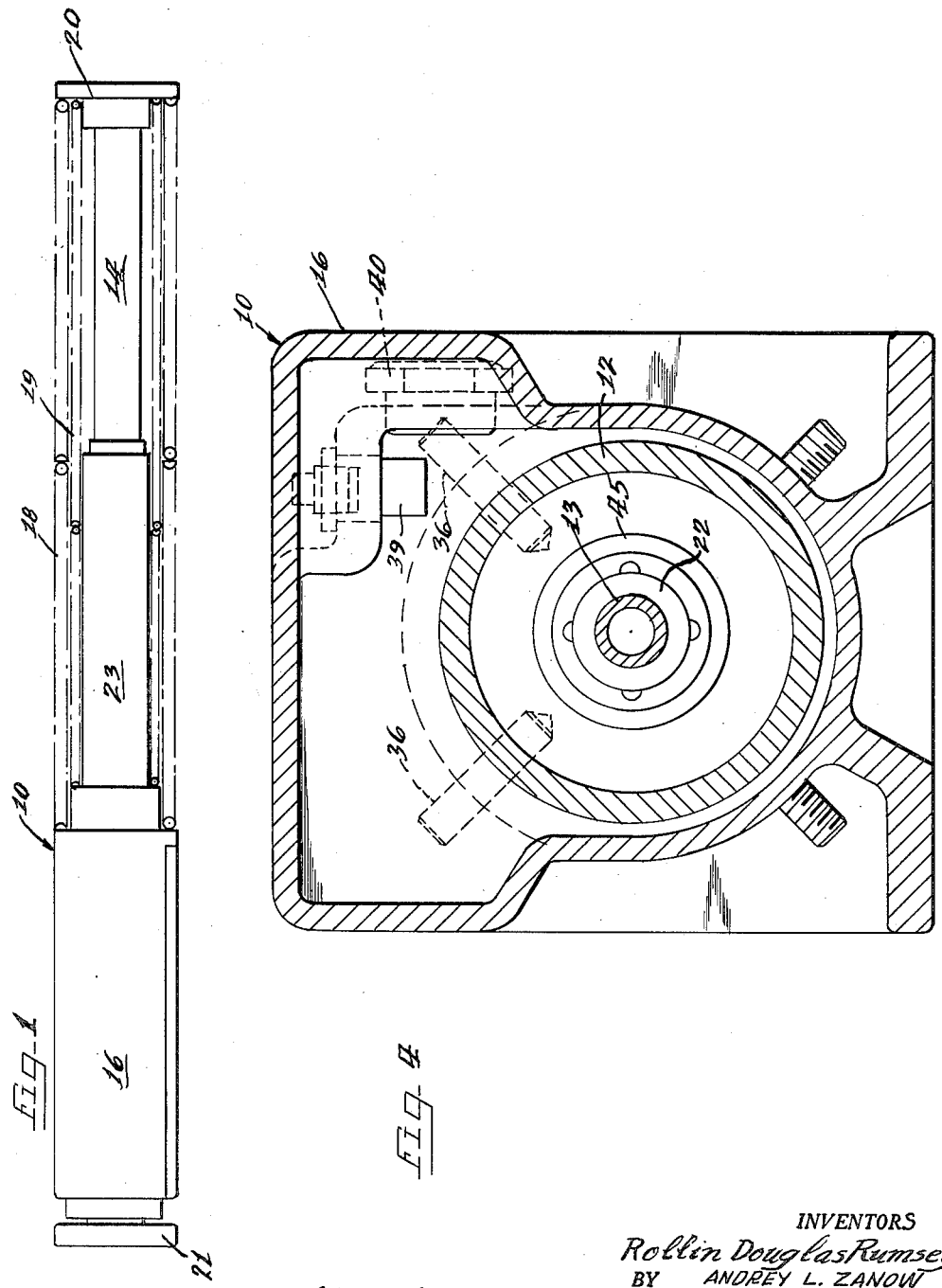

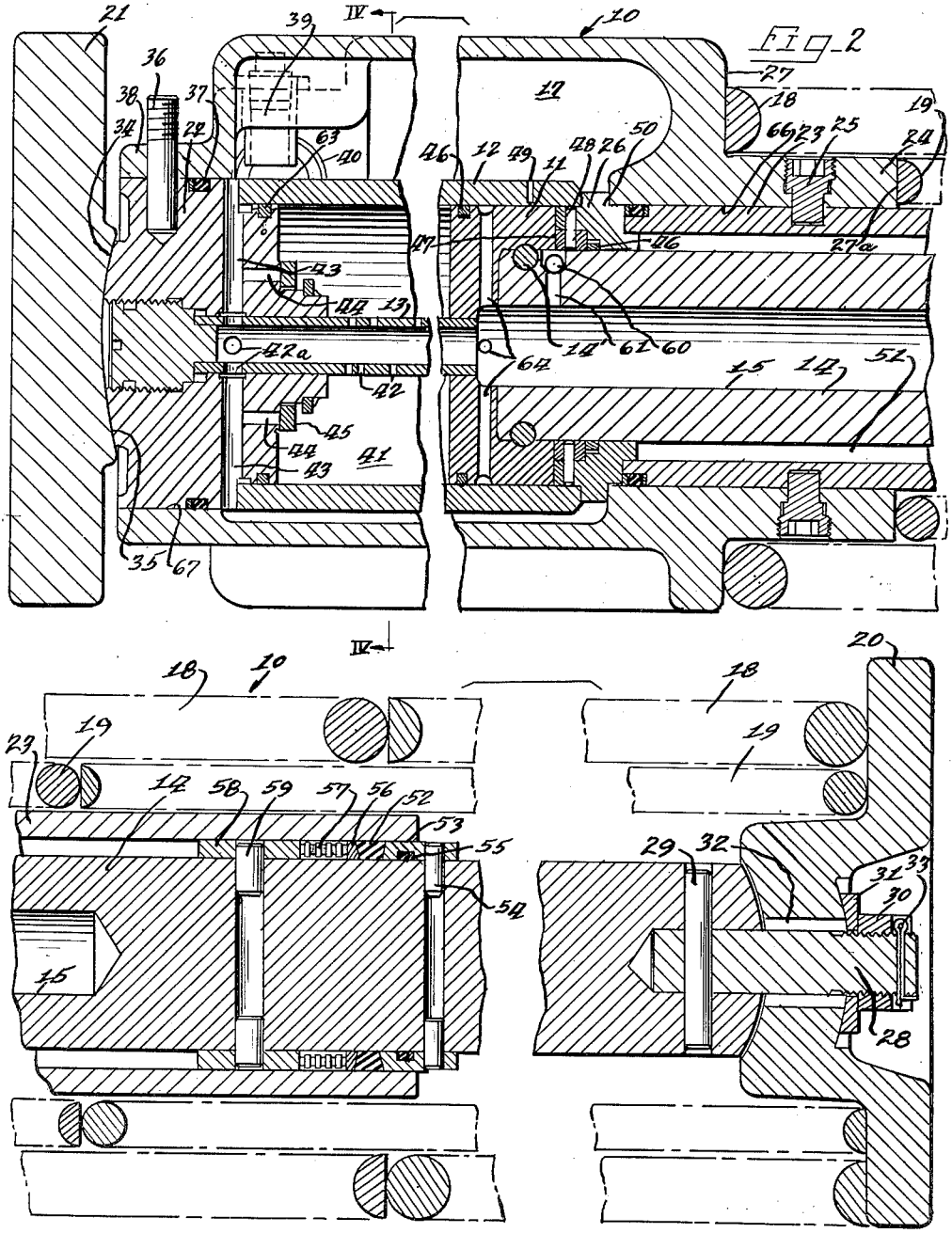

3,190,630
HYDRAULIC BUFFER
Rollin Douglas Rumsey, Buffalo, N.Y., and Andrey L. Zanow, Cleveland, Ohio, assignors to Houdaille Industries, Inc., Buffalo, N.Y., a corporation of Michigan, and National Castings Company, a corporation of Ohio
Filed Dec. 8, 1961, Ser. No. 157,981
17 Claims. (Cl. 267—1)

This invention relates to hydraulic shock absorbing buffers, and more particularly to an hydraulic shock absorbing buffer capable of absorbing high loads under adverse environmental conditions.

In various applications, as exemplified by radar antenna buffers, shock absorbing devices must survive long periods of inactivity and still provide reliable operation. During such inactive periods, the buffer can become smothered in paint or dirt. And in this and other applications, exemplary of which are buffers in aircraft, missiles and the like, extremely high capacity in proportion to size is a criterion, since weight and space are at a premium. Also, reliability in the field for hydraulic shock absorbing buffers has been difficult to achieve, which has created a particular hazard in situations where preventive maintenance could not be supplied.

The present invention provides a hydraulic shock absorbing buffer concept and construction which effectively overcomes the foregoing problems and meets the design objectives resulting from the difficulties indicated. Thus the buffer unit of the invention essentially consists of an hydraulic shock absorber and centering spring means, a plurality of springs being preferably provided in a suitable embodiment thereof for maximum centering force within a minimum amount of space, with the springs being coiled in opposite directions to prevent interlocking. The plurality of springs may be adjusted by a tension adjusting nut, particularly for assembly purposes, and the construction of the device is such that lathe work for the piston rod exterior is obviated.

In order to minimize stress effects, an embodiment of the invention provides for hydraulic metering by means of a small diameter concentric metering tube having non-uniformly spaced metering openings affording flow into a reservoir portion as well as into a buffer head. Fluid circuit means are provided to afford damping in each direction in a preferred construction, together with spring return, with the spring return and damping force being of a lesser magnitude than compressive damping force. The buffer effectively accommodates high hydraulic pressures by means of piston ring type seals which resist extrusion and wear, and check valve means are provided in the head end and piston of the invention to prevent cavitation on the suction side of the piston. Replenishing for further compressive damping is accomplished by gravity with a reservoir having a liquid level above the highest part of the working cylinder. Venting means may be provided also so that any air or gas evolving from the hydraulic fluid may escape directly to the reservoir to afford a "solid" or uniformly acting fluid, the vent orifice for this purpose being calibrated so that it cannot significantly affect damping performance. In order to prevent binding, in the form of the invention described, free swiveling ends for the buffer are afforded with widely spaced bearings being provided for the piston. Further, the external seals serve only a low pressure sealing function.

Accordingly, it is an object of the present invention to provide an improved hydraulic shock absorbing buffer capable of longer life and higher loads than previously available devices, even under adverse environmental conditions.

Another object of the invention is to provide a shock absorbing buffer as described having smooth working surfaces for high-pressure seals and continuous wall structures for high-pressure working cylinder portions.

Another object of the invention is to provide a buffer as described which prevents deterioration from external dirt or other contaminants.

Another object of the invention is to provide a device as described wherein external seals are of a relatively low pressure function in comparison with the internal seals.

Another object of the invention is to provide a device as described which, in a preferred embodiment thereof, has the high-pressure dynamic seals formed of a wear resistant metal construction.

Another object of the invention is to provide a buffer wherein the high-pressure chamber structure is such as to eliminate stress concentrations.

Other objects and advantages of the invention will become apparent as the description proceeds in accordance with the drawings in which:

FIGURE 1 is a side elevational view of a hydraulic shock absorbing buffer according to the present invention;

FIGURE 2 is a vertical sectional view of a portion of the structure shown in FIGURE 1;

FIGURE 3 is a vertical sectional view of a further portion of the structure shown in FIGURE 1; and FIGURE 4 is a vertical sectional view taken through the lines IV—IV of FIGURE 2.

Referring now to the drawings, an hydraulic shock absorbing buffer 10 is shown in accordance with the present invention which consists essentially of an hydraulic shock absorber and centering spring means. Thus the unit 10 includes a piston 11, a working cylinder 12 slidably receiving the piston 11, a concentric metering tube 13 on which the piston 11 is slidably mounted, a piston rod 14 secured to the piston by a dowel 14' or the like and having a bore 15 to receive the metering rod 13, a reservoir housing 16 forming a reservoir 17 and centering springs 18 and 19 bearing against the reservoir housing 16 and against a follower 20 mounted in free swiveling relation on the piston rod 14 and opposite a follower 21 in free swiveling relation to a front end head 22, as hereinafter further described. Also in accordance with the invention, an outer cylinder 23 is provided which may be secured to an extension 24 of the housing 16 by suitable dowel screw means or the like 25, and which may engage a closing ring 26 as also hereinafter described.

The buffer 10 is constructed so that a large load can be imposed at the ends thereof without causing a binding therein, and in order to obtain maximum centering force within a minimal amount of space, the centering springs 18 and 19 are utilized in tandem. These springs are coiled in opposite directions to prevent interlocking. The spring 18 may bear against an annular surface 27 on the housing 16 and the spring 19 may bear against the annular surface 27a on the extension 24 thereof, and it will be seen in FIGURE 3 that a plurality of the springs is provided in accordance with the invention with the ends thereof opposite the surfaces 27 and 27a bearing against the follower 20. Binding and bending of the unit is also obviated by the free swiveling connection of the followers 20 and 21, the follower 20 being secured to the piston rod 14 by means of a stud 28 engaged by a dowel pin 29 in the piston rod and threaded to engage a slotted nut 30 bearing aginst a thrust washer 31. The follower 20 has an inner bore 32 of larger diameter than the stud 28, and the follower 20, the thrust washer 31 and the end of the piston rod 14 have a complementary arcuate configuration to afford the said swiveling action. The slotted nut 30 may be securely connected by means of a cotter pin 33 to the stud 28. It will, of course, be appreciated that variations in this particular construction are encompassed within the scope of the invention, as hereinafter set forth. Likewise, the follower 21 has a concave bearing surface 34 engaging a complementary convex bearing surface 35 on the front end head 22 to afford the described swiveling action. The housing 16 may be connected to the head or front end 22 by pins 36, O-ring means 37 being interposed between the housing flange 38 and the front end 22.

The hydraulic portion of the unit 10 consists of the reservoir 17, the piston 11, the piston rod 14 and the working cylinder 12. The reservoir is provided with suitable plug and pipe means 39 for filling purpose and a sight gauge window 40 or the like, and is preferably normally filled to a working level corresponding to the upper surface of the working cylinder 12 with a suitable fluid which preferably is a non-viscous oil.

In operation, the piston rod 14 as actuated by load from a pair of relatively movable objects with which the device may be used, forces the piston 11 down the working cylinder 12 against the resistance of the hydraulic fluid. The fluid is thus forced to escape from the working chamber 41 of the working cylinder through non-uniform orifices 42 in the metering tube 13, which are actually square law-spaced in a preferred embodiment.

In this connection it will be noted that the working cylinder is unmarred by holes or notches over the major surface thereof, and is therefore of maximum stress carrying capability. The metering tube 13 is of small diameter and thus is well adapted to resist stress. Further, it is of a relatively heavy wall construction for its over-all size, and during compression stroke does not suffer strain as severely from the notch effect therein as would the working cylinder 12. It will therefore be appreciated that the relatively slight cost for extra material in the metering tube results in adequate strength in the metering tube area to resist very large stresses, and the piston working area and reservoir displacement are not affected adversely.

As the piston advances down the working cylinder 12, it successively closes off the orifices 42, thereby maintaining relatively constant working force as the velocity decreases. The oil forced through the metering holes 42 in the metering tube 13 flows through the tube and out tube openings 42a and through radial ports 43 which are drilled through the working chamber front end 22, into the reservoir 17, and the oil also flows through the metering tube into the bore 15 of the rod 14 as hereinafter described. Since the reservoir is constructed so that an oil level may be maintained at approximately the top of the cylinder 12, as described, adequate space for the fluid displaced by the piston is afforded.

The unit 10 is a two-way damper, and on the return stroke, therefore, damping is also effected, although at a much lower level. The oil is free to return from the reservoir 17 into the working chamber 41 through axial passages 44 which communicate with the passages 43 and are closed from the working chamber 41 by an annular check valve 45 or the like during working conditions or closing of the piston 11. Return damping is produced as a result of the difference in the inside diameter of the working cylinder 12 and the piston rod 14. Thus oil is trapped between the closing ring 26 and the piston 11 on the return stroke, and substantially retained within this area by the piston ring 46 and the mounting of the working cylinder 12 on the ring 26, it being noted that the closing ring is provided with a ring retainer 47 secured thereto by dowel pins 48. Since return stroke damping is considerably lower than the damping level on the working stroke, it is not necessary to provide a press fit of the working cylinder 12 on the ring 26, and a diametrical clearance of about .001 to .004 is preferably utilized; and the oil in this area between the closing ring and piston 11 flows through an orifice 49 in the working chamber 12, which may be for example, ¼", and the said clearance, which is thus in parallel with the orifice into the reservoir 17. Of course, in the event of extremely high damping requirements, a press fit of working cylinder 12 on ring 26 may be used.

It will be seen that the ring 26 has a diagonal slot or port 50 which permits fluid to flow freely from the reservoir 17 into a clearance area 51 between the rod 14 and the outer cylinder 23. In accordance with the invention, the rod 14 is sealed in relation to the outer cylinder 23 by means of a seal 52 which is an inverted trapezoid in cross-sectional configuration for effective sealing action, and which bears against a retainer 53 secured by dowel pins 54 to the piston rod 14 and having O-ring and back-up means 55 therein. A washer 56 bears against the opposite side of the seal 52 in complementary relation thereto and in order to provide wear take-up, a wave washer structure 57 bears against the washer 56. Also in accordance with the invention, a bearing 58 backs up the wave washer 57 as secured by dowel pins 59 to the piston 14. It will thus be seen that the seal and bearing elements are separate constructions so that wear in the bearing construction will not cause deterioration in sealing action.

The diagonal slot or port 50 accommodates changes in volume in the space 51 produced by the movement of the seal 52 up and down in this space.

A check valve 60, which may be a ball check or the like in an opening or passage 61, is provided in the piston rod 14 to permit oil to flow freely from the rod bore 15 which communicates with the metering tube inner diameter, to the area behind the piston during the downstroke, thereby overcoming any tendency for vacuum to be created in that area.

Accordingly, an extremely effective metering action is produced during the downstroke which accommodates exceptionally high loads without undue stress on any of the parts, and with good flow characteristics throughout, and the return stroke likewise effects damping as hereinabove described.

Since the unit 10 is normally fully extended, it is constructed so that the piston rod sealing surface or exterior surface of the rod 14 is always protected from external dirt and other contaminants in the extended position thereof. To this end, the seal structure 52 and associated elements are made to slide in an internal surface provided by the outer cyliner 23, so that the seal will always ride a clean, lubricated and smooth surface in the said outer cylinder. It may be noted in this connection that no machining, except drilling of holes, is required with respect to the rod 14 and in installing the seal structure.

In view of the buckling forces encountered by the unit, the piston rod is extremely well supported by means of spacing the bearing 58 a substantial axial distance from the piston 11, which serves as the opposite bearing. In order to afford effective wear resistance, the piston 11 may be formed of pearlitic malleable or cast iron and the bearing 58 may be formed of bronze or the like.

As indicated, the working unit 10 is adapted to withstand high working pressures, and the working cylinder 12 is capable of withstanding such stresses since no holes or notches are formed therein throughout the axial portion thereof which is subjected to high stress. Inasmuch as holes or the like have small effect on stress concentrations in members under compression, the metering holes 42 are utilized in the metering tube 13, and thus have a relatively minor effect on the structural integrity of the tube. A substantial saving in material weight and size is also achieved thereby. It may be noted that a metering pin may be utilized in substitution for the metering tube, with its proportionately spaced holes, but such metering pins are substantially more expensive to manufacture than is a tube according to the invention with non-uniformly spaced equally sized metering holes.

High pressure seals are provided for the working cylinder 12 which are piston ring seals 63 and 46′ in the head 22 and piston 11. Where exceptionally high impact or other velocities are encountered, the piston sealing ring 63 and ring 46 of piston ring construction may be omitted, so that the bulging of the working cylinder 12 under the high internal pressure may act as a relief valve to permit fluid to flow through the clearances around the piston and head and thence into the passages 64 and 43 therein.

Further advantages of the invention reside in the fact that the cylinder 12 need only be finished to a high accuracy on the bore thereof, and the metering tube 13 requires accurate finishing only on the outer diameter thereof. The metering tube may be welded in place if desired.

Also, the piston rod 14 needs no external machining and all concentricities are taken care of in the ring 26. The housing 16 is machined only at the two end bores 66 and 67.

Although we have herein set forth and described our invention with respect to certain specific principles and details thereof, it will be understood by those skilled in the art that these may be varied without departing from the spirit and scope of the invention as set forth herein in the appended claims.

We claim as our invention:

1. An hydraulic buffer adapted to be connected between a pair of relatively movable members comprising a cylinder, a piston in said cylinder, a piston rod on said piston extending outwardly of said cylinder, means for mounting the cylinder and the piston rod in free-swiveling relation to the pair of movable members including a follower retained in swivelling relation on the outer end of the piston rod by an axially extending stud, a reservoir housing surrounding the cylinder and defining a reservoir, spring means engaging the reservoir housing and said follower for free swiveling mounting of the piston rod relative to the movable member with which the follower is associated and urging the piston away from the cylinder, and means for metering fluid from the cylinder to the reservoir and to an area back of the piston, in response to closing action of the piston and means for metering fluid from the area back of the piston to the cylinder in response to return action of the piston to afford a two-way damping action.

2. An hydraulic buffer adapted to be connected between a pair of relatively movable members comprising a cylinder, a head engaging one end of said cylinder in normally sealing relationship, a metering tube secured in said head in concentric relationship within said cylinder, a piston slidably receiving the metering tube and disposed in said cylinder, a piston rod fixedly secured to the piston and defining an inner, axial bore communicating with the metering tube at one end and closed at the other end, a reservoir housing forming a reservoir surrounding said cylinder, said housing being secured to the head, radial passages in said head communicating with said metering tube and with said reservoir beyond said one end of the cylinder so that the adjacent end portion of the cylinder is free from any perforations therethrough, and means urging said piston away from said cylinder, said metering tube having a plurality of orifices formed axially therealong and metering fluid from said cylinder into said reservoir through said radial passages and to an area in back of the piston through said axial bore during closing of the piston and from the area in back of the piston to the reservoir during return of the piston, and check valve means in said head permitting fluid to flow from said reservoir to said cylinder on return movement of said piston.

3. An hydraulic buffer adapted to be connected between a pair of relatively movable members comprising a cylinder, a head engaging one end of said cylinder in normally sealing relationship, a metering tube secured in said head in concentric relationship within said cylinder, a piston slidably receiving the metering tube and disposed in said cylinder, a piston rod fixedly secured to the piston and defining an inner, axial bore communicating with the metering tube at one end and closed at the other end, a reservoir housing forming a reservoir surrounding said cylinder, said housing being secured to the head, radial passages in said head communicating with said metering tube and with said reservoir beyond said one end of the cylinder so that the adjacent end portion of the cylinder is free from any perforations therethrough, means urging said piston away from said cylinder, said metering tube having a plurality of orifices formed axially therealong and metering fluid from said cylinder into said reservoir through said radial passages during closing of the piston, check valve means in said piston transmitting fluid from the axial bore to an area in back of said piston during closing action and closed during return action, means metering fluid from said area to said reservoir during return of said piston and check valve means in said head metering fluid from said reservoir to said cylinder during return movement of said piston.

4. An hydraulic buffer to be connected between a pair of relatively movable members comprising a cylinder having a head at one end and a closing ring at the other end, a piston in said cylinder having a piston rod in sealing relation with said closing ring, a reservoir housing surrounding said cylinder and secured to said head, a cylinder portion secured in said reservoir housing in radially spaced relation to said piston rod, said reservoir housing forming a reservoir and said closing ring having a passage communicating with a space between the piston rod and the cylinder portion, sealing means on an outer portion of the piston rod in sealing relation with the cylinder portion, means urging said piston away from said head, a metering tube fixedly secured to said head and extending concentrically in said cylinder, said piston rod having an axial bore communicating with said metering tube, said meterng tube having a plurality of axially non-uniformly spaced orifices and said head having conduit means communicating between said metering tube and said reservoir, said metering tube metering fluid from said cylinder to said reservoir during closing of the piston, check valve means in said piston releasing fluid from said axial bore to an area in back of the piston and between the piston and the closing ring during closing of the piston, and closed during return of the piston, and check valve means in said head returning fluid from said reservoir to said cylinder during return of said piston.

5. An hydraulic buffer adapted to be connected between a pair of relatively movable members comprising a cylinder having a head at one end and a closing ring at the other end, a piston in said cylinder having a piston rod in sealing relation with said closing ring, a housing forming a reservoir surrounding said cylinder, said housing beng secured to said head, a cylinder extension secured to said housing in radially spaced relation to said piston rod, said closing ring having a passage communicating with a space between the piston rod and the cylinder extension, sealing means on the piston rod in sealing relation with the cylinder extension, means urging said piston away from said head, a metering tube fixedly secured to said head and extending concentrically in said cylinder, said piston rod having an axial bore communicating with said metering tube, said metering tube having a plurality of axially non-uniformly spaced orifices and said head having conduit means communicating between said metering tube and said reservoir, said metering tube metering fluid from said cylinder to said reservoir during closing of the piston, check valve means metering fluid from said axial bore to an area in back of said piston during closing of the piston, means metering fluid from said area to said reservoir during return of the piston and check valve means preventing transmission of fluid from the cylinder to the conduit means in the head during closing of the piston and affording transmission of fluid from the conduit means in the head to the cylinder during return of the piston.

6. An hydraulic buffer adapted to be connected between a pair of relatively movable members comprising a cylinder having a head at one end and a closing ring at the other end, a piston in said cylinder having a piston rod in sealing relation with said closing ring, a housing surrounding said cylinder and secured to said head, said housing forming a reservoir, a cylinder extension secured to said housing in radially spaced relation to said piston rod, said closing ring having a passage communicating with a space between the piston rod and the cylinder extension, sealing means on the piston rod in sealing relation with the cylinder extension, means urging said piston away from said head, a metering tube fixedly secured to said head and extending concentrically in said cylinder, said piston rod having an axial bore communicating with said metering tube, said metering tube having a plurality of axially non-uniformly spaced orifices and said head having conduit means communicating between said metering tube and said reservoir, said metering tube metering fluid from said cylinder to said reservoir and to an area in back of the piston during closing of the piston, and means metering fluid from the area back of the piston to the cylinder during return of the piston, said head and said piston each having piston ring type seals in sealing relation with said cylinder.

7. An hydraulic buffer adapted to be connected between a pair of relatively movable members comprising a cylinder having a head at one end and a closing ring at the other end, a piston in said cylinder having a piston rod in sealing relation with said closing ring, a housing defining a reservoir surrounding said cylinder and secured to said head, a cylinder extension secured to said housing in radially spaced relation to said piston rod, and said closing ring having a passage communicating with a space between the piston rod and the cylinder extension, sealing means on an outer portion of the piston rod in sealing relation with the cylinder extension, means urging said piston away from said head, a metering tube fixedly secured to said head and extending concentrically in said cylinder, said piston rod having an axial bore communicating with said metering tube, said metering tube having a plurality of axially non-uniformly spaced orifices and said head having conduit means communicating between said metering tube in said reservoir, said metering tube metering fluid from said cylinder to said reservoir and to an area in back of the piston during closing of the piston, said cylinder having an orifice metering fluid from said area to said reservoir during return of the piston, said head and said piston each having piston ring type seals in sealing relation with said cylinder and said sealing means on said piston rod including a resilient member, a retainer on said piston rod for said resilient member and wear take-up spring means urging the resilient member against the retainer.

8. An hydraulic buffer adapted to be connected between a pair of relatively movable members comprising a cylinder having a head at one end and a closing ring at the other end, a piston in said cylinder having a piston rod in sealing relation with said closing ring, a housing forming a reservoir surrounding said cylinder, said housing being secured to said head, a cylinder extension secured to said housing in radially spaced relation to said piston rod, said closing ring having a passage communicating with a space between the piston rod and the cylinder extension, sealing means on an outer portion of the piston rod in sealing relation with the cylinder extension, means urging said piston away from said head, a metering tube fixedly secured to said head and extending concentrically in said cylinder, said piston rod having an axial bore communicating with said metering tube, said metering tube having a plurality of axially non-uniformly spaced orifices and said head having conduit means communicating between said metering tube in said reservoir, said metering tube metering fluid from said cylinder to said reservoir and to an area in back of said piston during closing of the piston and means metering fluid from said area to said cylinder during return of the piston, and a bearing on said piston rod in bearing relation with said cylinder extension and in axially widely spaced relation to the piston.

9. An hydraulic buffer comprising a cylinder, a piston in said cylinder, a piston rod on said piston extending outwardly of the cylinder, a cylinder portion mounted in axially fixed relation to the cylinder and extending in radially spaced relation around the piston rod, sealing means on the piston rod in sealing relation with the cylinder portion, a closing ring between the cylinder and the space between the cylinder portion and the piston rod, a reservoir surrounding the cylinder, said closing ring having a conduit communicating between the reservoir and said space, means metering fluid from the cylinder to the reservoir in response to closing action of the piston, said piston having check valve means transmitting fluid from the cylinder to the area between the piston and the closing ring during closing action of the piston and preventing transmission of fluid from said area during return action of the piston and a bleed orifice in the cylinder adjacent the closing ring metering fluid from the area to the reservoir during the return action of the piston.

10. In a hydraulic buffer adapted to be connected between two relatively reciprocable members,
a housing having therein a working cylinder portion with means on the housing adjacent one end of the working cylinder portion for working engagement with one of the members,
a reservoir communicating with the working cylinder portion,
a piston having a piston head in reciprocable bearing hydraulic fluid displacing relation within the working cylinder portion and a piston rod projecting substantially beyond the remaining end of the working cylinder portion and beyond the housing and having means at its outer end for operative engagement with the other of said members, a concentric cylindrical extension portion projecting from the housing beyond said remaining end of the working cylinder portion and through which said piston rod extends, and two differential diameter concentrically telescopically disposed sets of plural tubular coiled compression springs in tandem relation to one another in each set and disposed in concentric relation about said extension portion and said rod and thrusting at one end of the tandem toward the adjacent end of the housing and at the other end of the tandem against said means at the outer end of the rod.

11. A hydraulic buffer adapted to be connected between a pair of relatively movable members and wherein the buffer is normally in an extended condition ready for compression stroke resistance to movement of the movable members toward one another and comprising,
a working cylinder,
means at one end of the working cylinder for thrusting opposition to one of the movable members,
a piston in said working cylinder and having a piston rod projecting to a substantial extent beyond the working cylinder and having means on its outer end to thrustingly oppose the other of the movable members,
means normally biasing the piston rod relative to the working cylinder to maintain an extended relationship of the piston rod and to maintain the piston in the end of the working cylinder nearest the piston rod,
means defining a shoulder to stop the piston within the working cylinder in the fully extended position of the piston rod,
an extension from the cylinder beyond said shoulder means and concentrically surrounding the piston rod, the piston rod projecting beyond the distal end of said extension a sufficient distance to permit full inward compression thrust movement of the piston while the outer end portion of the piston rod remains free from the extension, the inner surface of the extension providing a cylindrical surface, and annular bearing means and fluid sealing means on the piston rod located to engage said cylindrical surface adjacent to the distal end of the extension in the fully extended position of the piston rod and thereby sealing said cylindrical surface against entry of dirt or contaminants, the length of said cylindrical surface beyond said shoulder means being related to the full stroke range of the piston in the working cylinder to permit full range of working stroke of the piston.

12. An hydraulic buffer adapted to be connected between two relatively movable members, comprising a cylinder, a piston with a piston head reciprocable in said cylinder, means urging said piston outwardly of said cylinder, a housing surrounding said cylinder and forming a fluid reservoir with an enlarged portion elevated above the cylinder in a horizontal position of the buffer for a gravity replenishing action, means metering fluid from said cylinder in front of said piston head into said reservoir and into an area in back of said piston head in a direction in response to closing movements of the piston, means for passing fluid from the cylinder in front of the piston to the back of the piston during said closing movements of the piston and for checking passage of fluid from in back of the piston head to the cylinder during return movement of the piston, and means metering fluid from said area in back of said piston head to said reservoir in response to return movement of the piston, whereby to provide a two-directional damping action.

13. In a hydraulic buffer adapted to be connected between two relatively reciprocable members, a housing having therein a working cylinder portion with means on the housing adjacent one end of the working cylinder portion for working engagement with one of the members, a reservoir communicating with the working cylinder portion, a piston having a piston head in reciprocable bearing hydraulic fluid displacing relation within the working cylinder portion and a piston rod projecting substantially beyond the remaining end of the working cylinder portion and beyond the housing and having means at its outer end for operative engagement with the other of said members, a concentric cylindrical extension portion projecting from the housing beyond said remaining end of the working cylinder portion and through which said piston rod extends, and differential diameter generally telescopically and concentrically disposed tandem sets of tubular coiled compression springs disposed concentrically about said extension portion and said rod and thrusting at one end toward the adjacent end of the housing and at the other end against said means at the outer end of the rod, tandem springs of one of said sets having opposed ends which are staggered with respect to the opposed ends of the concentrically disposed tandem set.

14. A hydraulic buffer as defined in claim 13, wherein said means at the outer end of the rod comprises a follower member and the end of the rod and the follower member have complementary generally axially facing concave convex thrusting bearing surfaces affording a free swivelling relation therefor.

15. A buffer as defined in claim 14, wherein said means on the housing adjacent one end of the working cylinder portion comprises a follower having a complementary concave convex swivelling bearing structure.

16. An hydraulic buffer adapted to be connected between a pair of relatively movable members and comprising a cylinder, a head engaging one end of said cylinder in normally sealing relationship, a metering tube secured in said head in concentric relationship within said cylinder, a piston slidably receiving the metering tube and disposed in said cylinder, a piston rod fixedly secured to the piston and defining an inner, axial bore communicating with the metering tube at one end and closed at the other end, a reservoir housing forming a reservoir surrounding said cylinder, said head being secured to the housing, radial passages in said head communicating with said metering tube and with said reservoir beyond said one end of the cylinder so that the adjacent end portion of the cylinder is free from any perforations therethrough, and means urging said piston away from said cylinder, said metering tube having a plurality of orifices formed axially therealong and metering fluid from said cylinder into said reservoir through said radial passages and to an area in back of the piston through said axial bore during closing of the piston and from the area in back of the piston to the reservoir during return of the piston, said cylinder being in straight cylindrical sliding fit and normally substantially sealing relation about a portion of said head and being relatively slightly radially expansible relative to said portion of the head in response to high internal pressure in the cylinder whereby to afford passage of fluid to said radial passages in the head during closing action of the piston for thereby acting as a relief valve.

17. A hydraulic buffer adapted to be connected between opposed members movement of which toward one another and the buffer is adapted to be resisted and the buffer comprising, a housing defining a reservoir chamber closed at one end and opening from the opposite end of the housing, a working cylinder within said housing surrounded by the reservoir chamber and having an end attached to said closed end with the opposite end of the cylinder adjacent to but spaced from said open end, a tubular extension within said open end, a closure ring member engaging said housing and said opposite end of the cylinder in closing relation to the reservoir and coacting with the housing and cylinder and extension in maintaining the cylinder concentric with said extension, a piston reciprocably operable in said cylinder and having a piston rod extending through said closure ring and through said extension and beyond the free end of the extension, and bearing means on the piston engaging in said extension.

References Cited by the Examiner

UNITED STATES PATENTS

| 1,082,217 | 12/13 | Vermersch. | |
| 1,723,963 | 8/29 | Weymouth. | |
| 1,821,787 | 9/31 | Black | 267—1 |
| 1,956,669 | 5/34 | Charles | 267—34 |
| 2,002,606 | 5/35 | Kistner | 277—214 X |
| 2,078,364 | 4/37 | Becker et al. | 267—8 X |
| 2,094,882 | 10/37 | Garnett et al. | |
| 2,171,827 | 9/39 | Elliott | 188—88 |
| 2,357,920 | 9/44 | Whistler | 188—88 |

(Other references on following page)

| | | UNITED STATES PATENTS | |
|---|---|---|---|
| 2,527,980 | 10/50 | Bachman | 267—64 |
| 2,655,232 | 10/53 | Etherton | 267—64 X |
| 2,686,668 | 8/54 | Bettison | 267—1 |
| 2,723,847 | 11/55 | Hogan | 267—64 |
| 3,033,384 | 5/62 | Zanow et al. | 213—43 |
| 3,035,714 | 5/62 | Peterson | 267—34 X |
| 3,052,328 | 9/62 | Brueckner | 188—88 |
| 3,070,363 | 12/62 | Ellis | 267—1 |

| | | FOREIGN PATENTS | |
|---|---|---|---|
| 441,634 | 1/36 | Great Britain. | |
| 513,389 | 10/39 | Great Britain. | |
| 863,976 | 3/61 | Great Britain. | |
| 1,249,513 | 11/60 | France. | |

ARTHUR L. LA POINT, *Primary Examiner.*

RICHARD A. DOUGLAS, *Examiner.*